United States Patent
Solodky et al.

(10) Patent No.: US 10,795,013 B2
(45) Date of Patent: Oct. 6, 2020

(54) MULTI-TARGET DETECTION IN CDMA RADAR SYSTEM

(71) Applicant: GM Global Technology Operations LLC, Detroit, MI (US)

(72) Inventors: Gaston Solodky, Kfar Saba (IL); Shahar Villeval, Tel Aviv (IL); Oren Longman, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 157 days.

(21) Appl. No.: 16/182,847

(22) Filed: Nov. 7, 2018

(65) Prior Publication Data

US 2020/0142049 A1 May 7, 2020

(51) Int. Cl.
*G01S 13/72* (2006.01)
*G01S 13/56* (2006.01)
*G01S 13/931* (2020.01)
*G01S 13/538* (2006.01)

(52) U.S. Cl.
CPC .......... *G01S 13/726* (2013.01); *G01S 13/538* (2013.01); *G01S 13/56* (2013.01); *G01S 13/931* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,831,977 A * | 11/1998 | Dent | ...................... | H04B 7/086 370/335 |
| 5,995,499 A * | 11/1999 | Hottinen | ............. | H04L 25/0204 370/337 |
| 6,546,043 B1 * | 4/2003 | Kong | ................... | H04B 1/7103 375/148 |
| 6,920,192 B1 * | 7/2005 | Laroia | ................. | H04B 7/0854 370/342 |
| 2004/0151152 A1 * | 8/2004 | Kim | .................. | H04W 56/0065 370/342 |
| 2010/0207804 A1 * | 8/2010 | Hayward | ................ | G01S 7/414 342/28 |
| 2015/0319634 A1 * | 11/2015 | Zwirn | ................... | H04W 24/10 370/252 |
| 2017/0307729 A1 * | 10/2017 | Eshraghi | ............... | G01S 13/931 |
| 2019/0079177 A1 * | 3/2019 | Lee | ........................ | G01S 13/422 |
| 2019/0196008 A1 * | 6/2019 | Lee | ........................ | G01S 13/95 |

* cited by examiner

*Primary Examiner* — Mamadou L Diallo
(74) *Attorney, Agent, or Firm* — Cantor Colburn LLP

(57) ABSTRACT

A system and method to perform multi-target detection in a code division multiple access (CDMA) radar system involve transmitting, from each transmitter among T transmitters, a transmitted signal with a different code, and receiving, at each receiver among one or more receivers, a received signal that includes reflections resulting from each of the transmitted signals with the different codes. The method includes processing the received signal at each of the one or more receivers by implementing T processing chains. Each of the T processing chains is iterative. The method also includes detecting an object at each completed iteration at each of the T processing chains, and subtracting a subtraction signal representing a contribution of the object to the received signal prior to subsequent iterations.

20 Claims, 7 Drawing Sheets

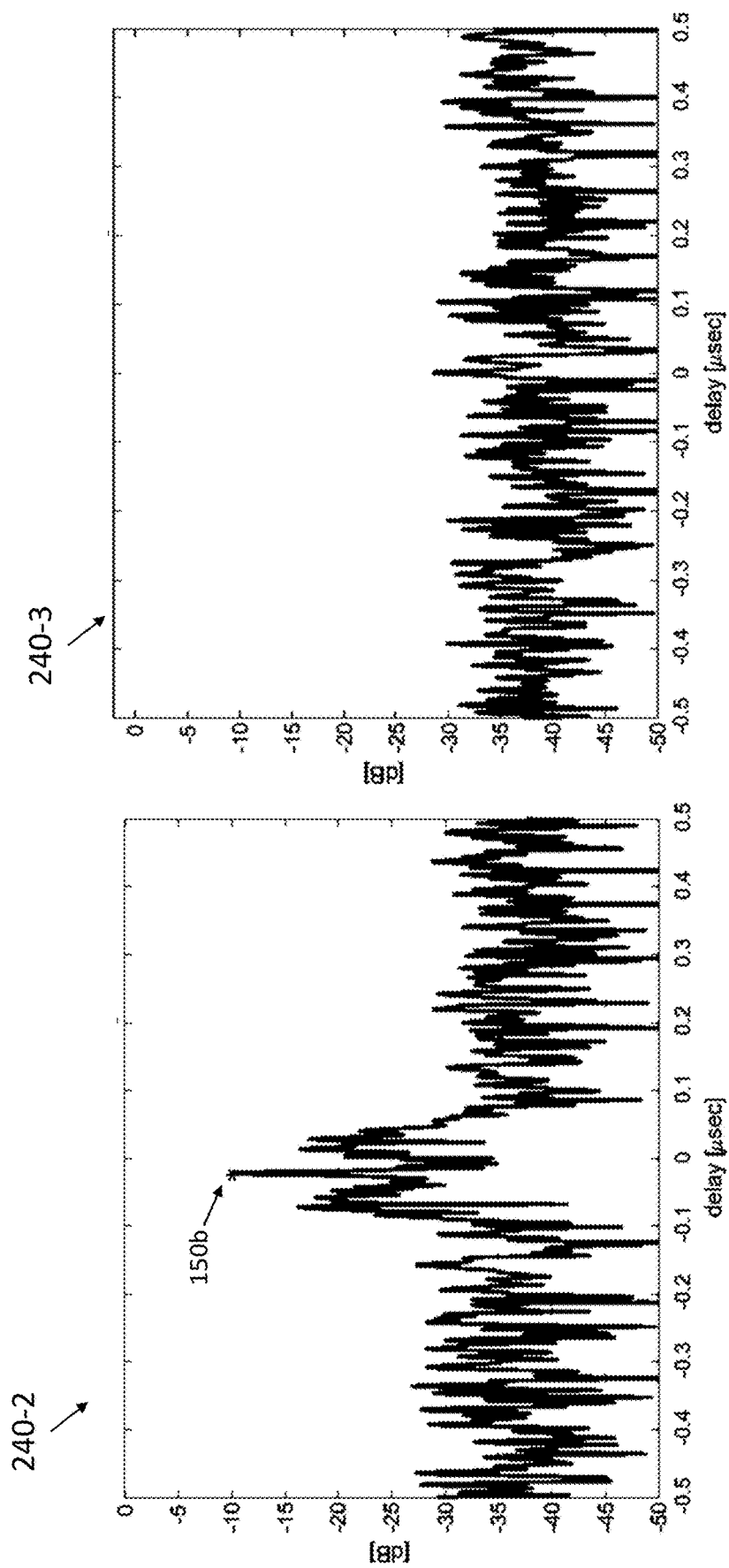

MULTI-TARGET DETECTION IN CDMA RADAR SYSTEM

INTRODUCTION

The subject disclosure relates to multi-target detection in a code division multiple access (CDMA) radar system.

Radar systems are increasingly used to detect and track objects. For example, a vehicle (e.g., automobile, truck, construction equipment, farm equipment, automated factory equipment) may include one or more radar systems to detect potential obstacles in its path of travel. Detection of objects facilitates enhanced or automated vehicle operation (e.g., adaptive cruise control, collision avoidance, automatic braking). A multiple-input multiple-output (MIMO) radar system, for example, includes multiple transmitters and multiple receivers that receive reflections resulting from transmissions by all of the transmitters. A single-input multiple-output (SIMO) radar system, as another example, includes multiple transmitters and a single receiver that receives reflections resulting from transmissions by all of the transmitters. A CDMA radar system includes transmitters that each transmit a different code simultaneously. The use of a CDMA scheme can cause high cross-correlation levels or interference among reflections resulting from the different transmitters. Accordingly, it is desirable to provide multi-target detection in a CDMA radar system.

SUMMARY

In one exemplary embodiment, a method of performing multi-target detection in a code division multiple access (CDMA) radar system includes transmitting, from each transmitter among T transmitters, a transmitted signal with a different code, and receiving, at each receiver among one or more receivers, a received signal that includes reflections resulting from each of the transmitted signals with the different codes. The received signal at each of the one or more receivers is processed by implementing T processing chains. Each of the T processing chains is iterative. The method also includes detecting an object at each completed iteration at each of the T processing chains, and subtracting a subtraction signal representing a contribution of the object to the received signal prior to subsequent iterations.

In addition to one or more of the features described herein, the processing the received signal by implementing the T processing chains includes applying a matched filter, at each of the T processing chains, with a different one of the different codes.

In addition to one or more of the features described herein, the processing the received signal includes performing a fast Fourier transform (FFT) in a Doppler domain on an output of the matched filter in each of the T processing chains.

In addition to one or more of the features described herein, the processing the received signal at each of the T processing chains includes implementing a detection by detecting the object with a strongest reflection followed by generating a clean received signal resulting from the object and from cross-correlation with the different codes other than the different one of the different codes at each of the T processing chains.

In addition to one or more of the features described herein, the processing the received signal includes providing the clean received signal to a subtractor for subtraction.

In addition to one or more of the features described herein, the processing the received signal includes providing a result of the subtraction to the matched filter.

In addition to one or more of the features described herein, the processing the received signal includes subtracting the clean received signal from the received signal during a first iteration of the iterations and from the result of the subtraction for a previous iteration for every subsequent iteration of the iterations.

In addition to one or more of the features described herein, the processing the received signal includes providing a result of the subtraction to the implementing the detection.

In addition to one or more of the features described herein, the processing the received signal includes subtracting the clean received signal from a result of the FFT in the Doppler domain during a first iteration of the iterations and from the result of the subtraction for a previous iteration for every subsequent iteration of the iterations.

In addition to one or more of the features described herein, the method also includes including the radar system in a vehicle and controlling operation of the vehicle based on information about the object detected at each completed iteration of each of the T processing chains.

In another exemplary embodiment, a system to perform multi-target detection in a code division multiple access (CDMA) radar system includes T transmitters to transmit, from each transmitter among the T transmitters, a transmitted signal with a different code, and one or more receivers to receive, at each receiver among the one or more receivers, a received signal that includes reflections resulting from each of the transmitted signals with the different codes. The system also includes a processor to process the received signal at each of the one or more receivers by implementing T processing chains. Each of the T processing chains is iterative. An object is detected at each completed iteration at each of the T processing chains, and a subtraction signal representing a contribution of the object to the received signal is subtracted prior to subsequent iterations.

In addition to one or more of the features described herein, the processor applies a matched filter, at each of the T processing chains, with a different one of the different codes.

In addition to one or more of the features described herein, the processor performs a fast Fourier transform (FFT) in a Doppler domain on an output of the matched filter in each of the T processing chains.

In addition to one or more of the features described herein, the processor detects the object with a strongest reflection and then generates a clean received signal resulting from the object and from cross-correlation with the different codes other than the different one of the different codes at each of the T processing chains.

In addition to one or more of the features described herein, the processor provides the clean received signal to a subtractor for subtraction.

In addition to one or more of the features described herein, the processor provides a result of the subtraction to the matched filter.

In addition to one or more of the features described herein, the processor subtracts the clean received signal from the received signal during a first iteration of the iterations and from the result of the subtraction for a previous iteration for every subsequent iteration of the iterations.

In addition to one or more of the features described herein, the processor provides a result of the subtraction to detect the object in a next iteration of the iterations.

In addition to one or more of the features described herein, the processor subtracts the clean received signal from a result of the FFT in the Doppler domain during a first iteration of the iterations and from the result of the subtraction for a previous iteration for every subsequent iteration of the iterations.

In addition to one or more of the features described herein, the radar system is in a vehicle and operation of the vehicle is based on information about the object detected at each completed iteration of each of the T processing chains.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 5 shows the exemplary matched filter result during a second iteration;

FIG. 6 shows the exemplary matched filter result during a third iteration;

DETAILED DESCRIPTION

Figure 1:
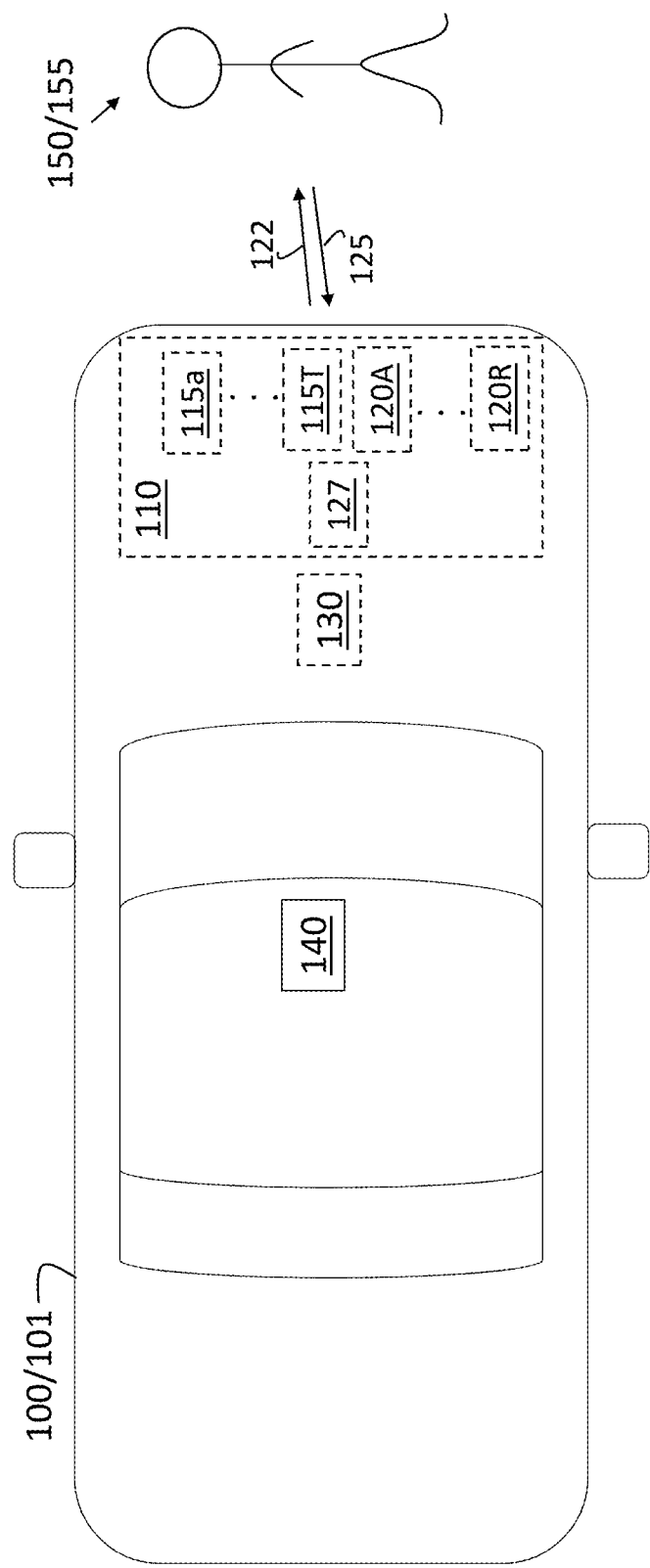
FIG. 1 is a block diagram of a vehicle that obtains multi-target detection using a code division multiple access (CDMA) radar system according to one or more embodiments.

The following description is merely exemplary in nature and is not intended to limit the present disclosure, its application or uses. It should be understood that throughout the drawings, corresponding reference numerals indicate like or corresponding parts and features.

CDMA radar systems may be used in scenarios, such as a vehicle application, because they provide improved performance. For example, a MIMO radar system uses orthogonal signals. Typically, a time division multiple access (TDMA) scheme is used. A TDMA radar system uses highly orthogonal signals, each transmitter transmits in turn. However, this scheme reduces radar performance (e.g., detection range, maximal Doppler) compared with other approaches, such as CDMA. CDMA signals are easy to implement but suffer from orthogonality imperfection and, thus, suffer from cross-correlation (i.e., interference due to reflections resulting from other transmitters). While cross-correlation is less of an issue in communication systems, detection of multiple targets by a radar system is made more challenging by the cross-correlation. Cross-correlation can reduce dynamic range, for example. Embodiments of the systems and methods are directed to multi-target detection in a CDMA radar system. As detailed, a processing chain removes the signal and side lobes corresponding with the strongest target at each iteration. In this way, the next strongest target is detected in each subsequent iteration.

In accordance with an exemplary embodiment, FIG. 1 is a block diagram of a vehicle 100 that obtains multi-target detection using a CDMA radar system 110 according to one or more embodiments. The vehicle 100 shown in FIG. 1 is an automobile 101. The exemplary radar system 110 is a MIMO system that includes transmitters 115A through 115T (generally referred to as 115) that emit transmit signals 122. Each transmitter 115 transmits a transmit signal 122 with a different code according to the CDMA scheme. The radar system 110 also includes receivers 120A through 120R (generally referred to a 120) that each obtain received signals 125 based on reflection of the transmit signals 122 by objects 150 in the field of view of the radar system 110. The exemplary object 150 shown in FIG. 1 is a pedestrian 155.

The radar system 110 may additionally include processing circuitry 127. The vehicle 100 includes one or more controllers 130 (e.g., electronic control unit (ECU). The controller 130 may also include processing circuitry. The reflections 125 may be processed by the processing circuitry 127 of the radar system 110, by the controller 130, or by a combination of the two. The processing circuitry 127 of the radar system 110 and the controller 130 may include an application specific integrated circuit (ASIC), an electronic circuit, a processor (shared, dedicated, or group) and memory that executes one or more software or firmware programs, a combinational logic circuit, and/or other suitable components that provide the described functionality. The vehicle 100 may also include additional sensors 140 (e.g., lidar, cameras). According to alternate or additional embodiments, the components shown in FIG. 1 may be located in or on different parts of the vehicle 100.

As previously noted, the transmitters 115 of the radar system 110 may transmit simultaneously because the transmit signal 122 from each transmitter 115 includes a different code. At each receiver 120, the reflections resulting from the transmit signals 122 from all of the transmitters 115 are received as a received signal 125, and the reflection associated with each transmitter 115 can be distinguished by the corresponding code. Each receiver 120 must process the received signal 125 to parse out the contribution of each of the transmitted codes in order to detect objects 150. When an autocorrelation of a given received signal 125 is performed with one of the transmitted codes, the result includes not only a peak associated with the autocorrelation result but also side lobes resulting from cross-correlation due to the other transmitted codes. These side lobes can obscure peaks associated with weaker reflections from objects 150 and thereby prevent the detection of those objects 150. As detailed with reference to FIGS. 2-5, the processing chains according to two or more embodiments facilitate removal of the signal contribution (peak and side lobes) associated with an object 150 during each iteration such that all the objects 150 in the field of view of the radar system 110 can be detected over a corresponding number of iterations.

Figure 2:
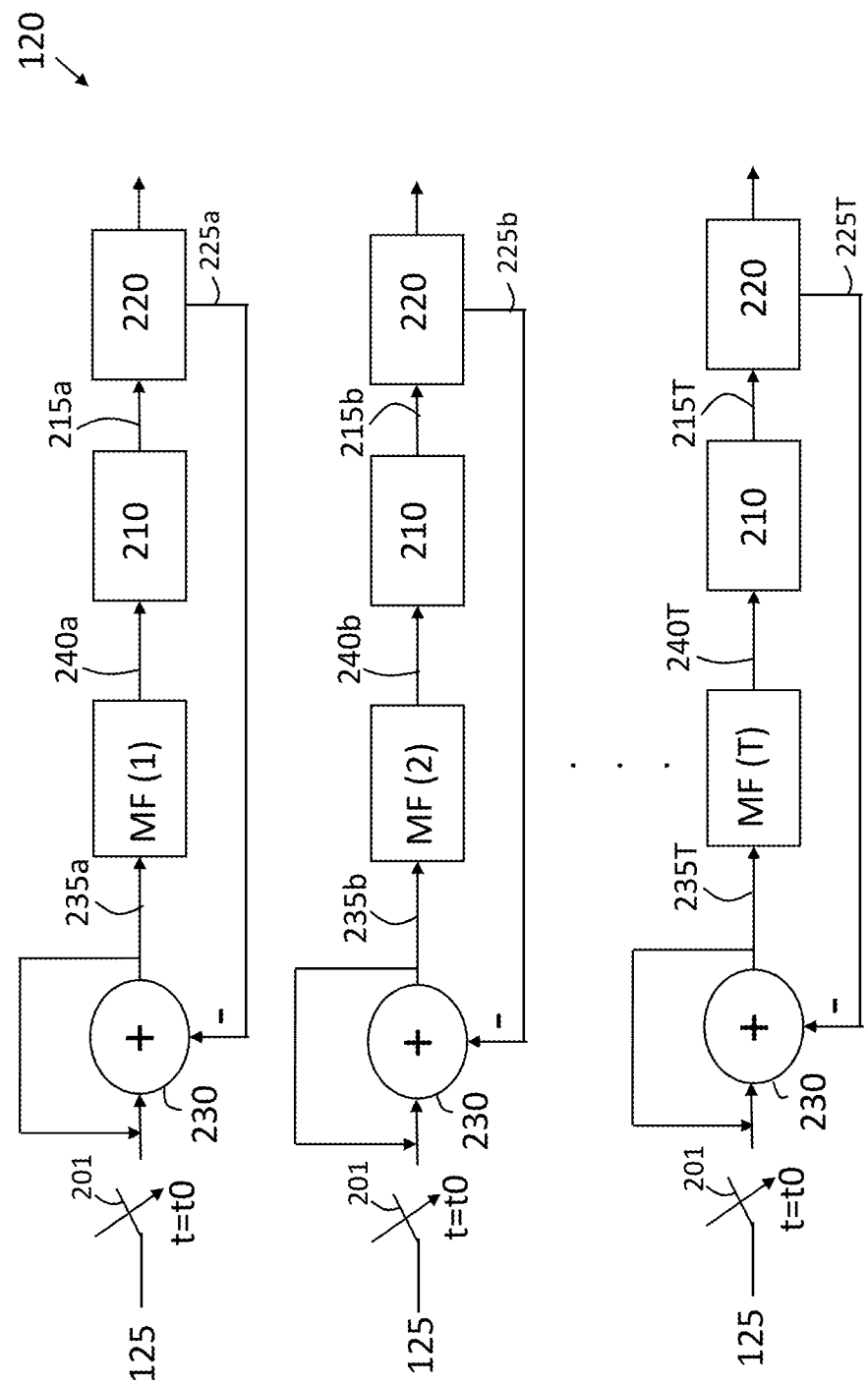
FIG. 2 is a block diagram of a process flow to process a received signal at one of the receivers according to one exemplary embodiment.

FIG. 2 is a block diagram of a process flow to process a received signal 125 at one of the receivers 120 according to one exemplary embodiment. The received signal 125 indicates amplitude and phase over time. At each receiver 120, there are T processing chains for each received signal 125, as shown in FIG. 2. The process flow shown in FIG. 2 (i.e., all T processing chains) is performed at each receiver 120 for each received signal 125. The T processing chains are associated with the T different codes transmitted in the corresponding transmit signals 122 by the transmitters 115 of the exemplary radar system 110. The subtractor 230 passes through the received signal 125 as the subtraction result 235 during the first iteration (i.e., at t=t0) of each processing chain. The switch 201 is open for all subsequent iterations such that the received signal 125 is not passed through. As indicated, the subtraction result 235 in each processing chain is also moved to the input of the subtractor 230, as further detailed. This subtraction result 235 is provided to a matched filter MF. As FIG. 2 indicates, the matched filter MF in each of the processing chains is different (i.e., (1) through (T)), because the matched filter MF is specific to the code corresponding with each transmit signal 122.

In each processing chain, the matched filter MF result 240 (240a through 240T for the T processing chains) is provided to a Doppler fast Fourier transform (FFT) block 210. The matched filter MF result 240, like the received signal 125, indicates amplitude and phase over time, while the Doppler FFT output 215 indicates amplitude and phase over frequency. The Doppler FFT output 215a through 215T at each respective processing chain (referred to generally as 215) is provided to multi-target detection block 220, which is further detailed with reference to FIG. 3. The subtraction signal 225 (one of 225a through 225T for the T processing chains) output by the multi-target detection block 220 includes the strongest peak, due to one of the codes, and associated side lobe contributions, due to cross-correlation with the other T-1 codes, for a detected object 150. As FIG. 2 indicates, this subtraction signal 225 is subtracted from the latest subtraction result 235.

As previously noted, in the first iteration, the switch 201 is activated and the input to the subtractor 230 is the received signal 125. Thus, in the first iteration, the subtraction signal 225 is subtracted from the received signal 125 (i.e., the subtraction result 235 after the first iteration is: received signal 125—subtraction signal 225 of the first iteration). Starting with the second iteration, the switch 201 is off, and the input to the subtractor 230 is the previous output of the subtractor 230, as shown. In the second iteration, the subtraction signal 225 includes the second strongest peak and associated side lobe contributions. The strongest peak in each iteration indicates an object 150. Thus, over the iterations, multiple objects 150 that may otherwise be obscured by the side lobes may be detected in the multi-target detection block 220 of each processing chain. While a multi-target detection block 220 is shown for each of the T processing chains for explanatory purposes, a single multi-target detection block 220 may be shared by the processing chains of a receiver 120 to perform joint estimation of parameters using the result of all T of the matched filter MF results 240.

Figure 3:
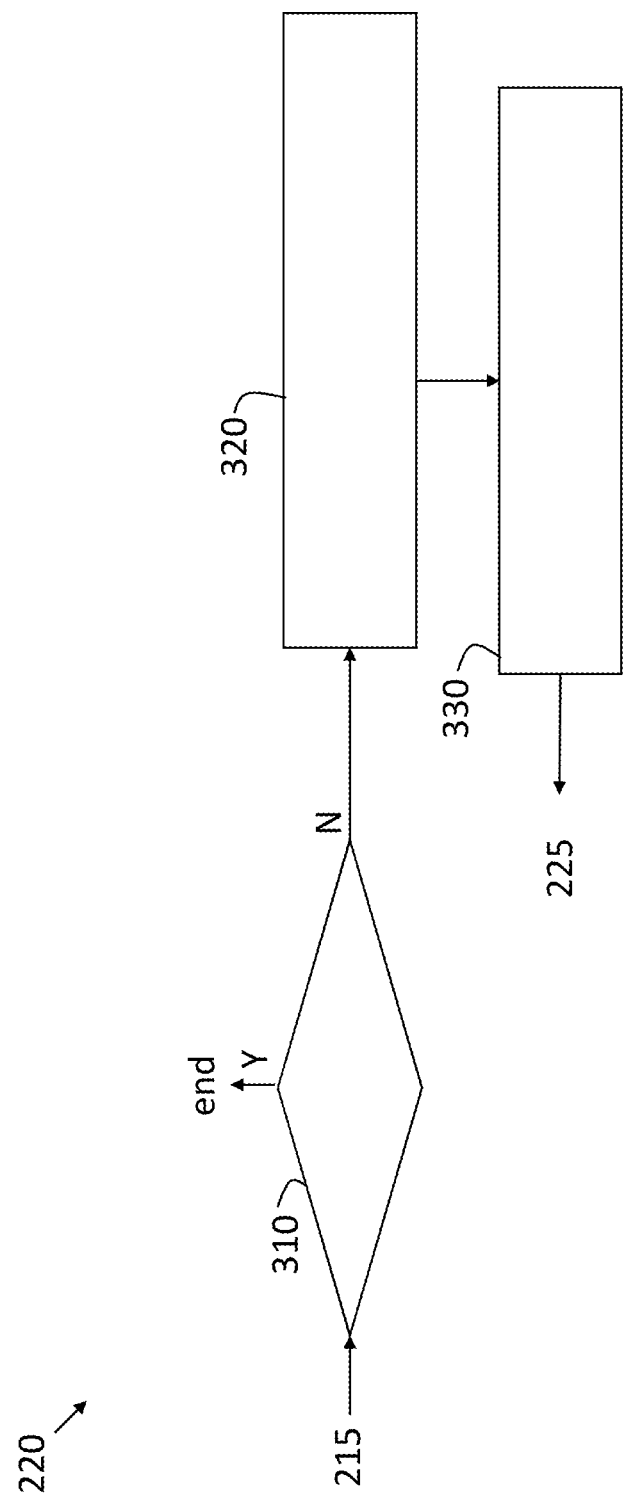
FIG. 3 details processes of the multi-target detection block according to one or more embodiments.

FIG. 3 details processes of the multi-target detection block 220 of FIG. 2 according to one or more embodiments. The Doppler FFT output 215 is provided to the multi-target detection block 220 at each iteration. At block 310, a check is done to see if the maximum peak in the Doppler FFT output 215 is less than or equal to a threshold value. The threshold value may be a predefined object detection threshold value, and may be a dynamic threshold. If the maximum peak is below this threshold value, then it is determined that there is no object 150 for detection and the processing chain ends without further iterations or completion of the multi-target detection block 220. If the maximum peak is not less than or equal to the threshold value, then estimating amplitude, delay (i.e., range), and Doppler frequency (i.e., relative velocity) for the maximum peak, at block 320, results in detecting the object 150 in the field of view of the radar system 110 that resulted in the strongest reflection (for the given iteration). At block 330, the process results in generating a clean signal (subtraction signal 225) associated with the detected object 150 and its associated cross-correlation so that all contributions from the already detected object 150 can be removed by the subtractor 230 shown in FIG. 2.

At block 330, generating T CDMA signals with estimated and known parameters refers to generating a simulated received signal that is a combination of reflections, based on each of the T transmitted codes that would have resulted from only the object 150 that was detected at block 320. The estimated parameters include amplitude, delay, and Doppler frequency, estimated at block 320, and the known parameters are the known CDMA signal parameters and function that were used to generate the transmitted signal 115. This subtraction signal 225 then represents the complete contribution to the received signal 125 because of the object 150 that was detected at block 320. As discussed with reference to FIG. 2, the subtraction of this subtraction signal 225 from the previous subtraction result 235 (i.e., the received signal 125 in the first iteration) facilitates the detection of additional objects 150 whose reflections may have been obscured by side lobes that were removed as part of the subtraction signal 225.

Figure 4:
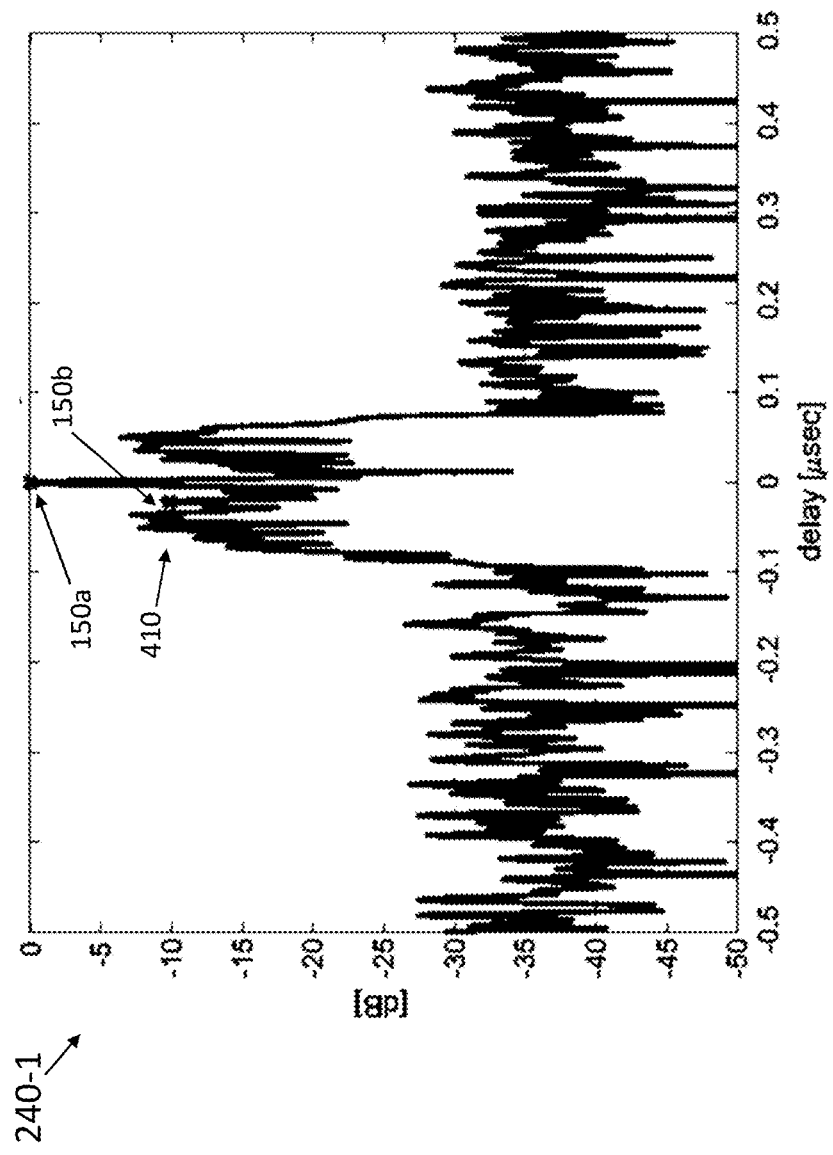
FIG. 4 shows an exemplary matched filter result during a first iteration.

FIGS. 4-6 illustrate the multi-target detection performed according to the embodiment discussed with reference to FIGS. 2 and 3. The exemplary radar system 110 used to obtain a received signal 125 for processing according to one or more embodiments discussed with reference to FIG. 2 may be a SIMO system with three transmitters 115 (i.e., T=3) and one receiver 120 (i.e., R=1). FIG. 4 shows an exemplary matched filter MF result 240-1 that is obtained during a first iteration of one of the T processing chains (processing chain X) shown in FIG. 2. Thus, the matched filter MF in the example implements code X associated with one of the transmitted signals 122. Delay in microseconds (usec) is shown along one axis and amplitude in decibels (dB) is shown along a perpendicular axis. Two objects 150a and 150b are indicated in the matched filter MF result 240-1. As FIG. 4 indicates, the object 150b is obscured by side lobes 410 resulting from strong cross-correlation with reflections resulting from transmitted signals 122 that include codes other than X. The object 150a generates the maximum peak in the Doppler FFT output 215 and is detected at the multi-target detection block 220 during the first iteration. The three CDMA signals associated with object 150a are then provided as the subtraction signal 225.

FIG. 5 shows the matched filter MF result 240-2 that is obtained during a second iteration. The input to the matched filter MF during this second iteration is the subtraction result 235, which results from subtraction of the subtraction signal 225 (associated with object 150a) from the received signal 125. In the second iteration, with the contribution from object 150a removed from the received signal 125, the matched filter MF result 240-2 indicates that object 150b generates the maximum peak in the Doppler FFT output 215 and is detected at the multi-target detection block 220. The three CDMA signals associated with object 150b are then provided as the subtraction signal 225 for the second iteration.

FIG. 6 shows the matched filter MF result 240-3 that is obtained during a third iteration. The input to the matched filter MF during this third iteration is the subtraction result 235, which results from subtraction of the subtraction signal 225 (associated with object 150b) from the previous subtraction result 235 (which resulted from subtraction of signal associated with object 150a from the received signal 125). As FIG. 6 indicates, the matched filter MF result 240-3 does not evidence any objects 150 for further detection. That is, at block 310, the max peak of the Doppler FFT output 215, which is based on the matched filter MF result 240-3, will likely not be greater than the threshold value such that the third iteration will end without completion or detection of any further objects 150.

Figure 7:
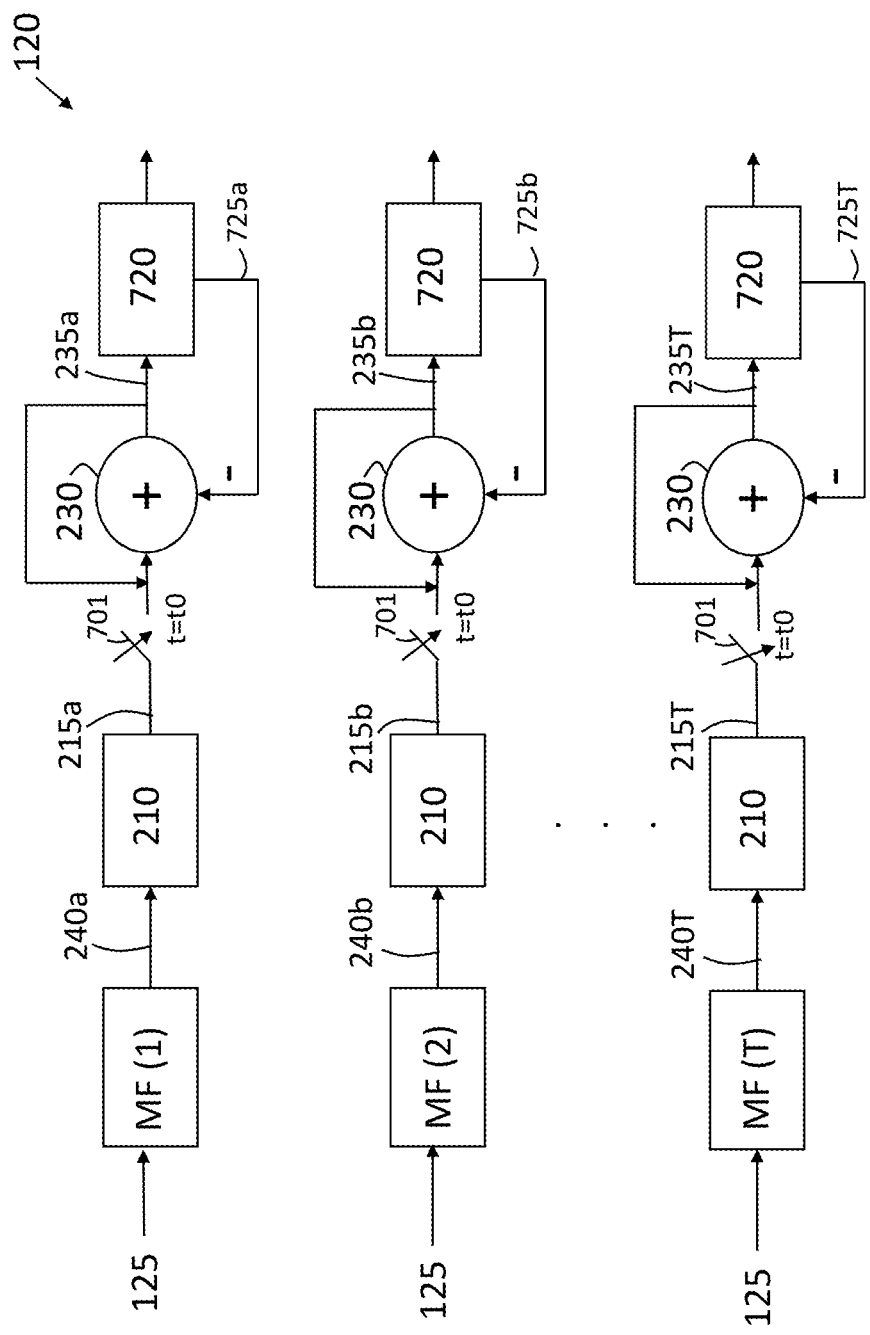
FIG. 7 is a block diagram of a process flow to process a received signal at one of the receivers according to another exemplary embodiment.

FIG. 7 is a block diagram of a process flow to process a received signal 125 received at one of the receivers 120 according to another exemplary embodiment. The process flow according to the exemplary embodiment shown in FIG. 7 is a variation of the process flow according to the exemplary embodiment shown in FIG. 2. Thus, the identical processing blocks with the same labels as those in FIG. 2 are not detailed again. In each of the T processing chains implemented for each receiver 120, the received signal 125 is provided to the respective matched filter MF(1) through MF(T). The matched filter MF result 240 is provided to the Doppler FFT block 210, and the Doppler FFT output 215 is provided to the subtractor 230 only during the first iteration (i.e., at t=t0). The switch 701 opens after the first iteration such that the subtraction result 235 is the input to the subtractor 230 in subsequent iterations, as shown.

A multi-target detection block 720, according to the embodiment shown in FIG. 7, is detailed with reference to FIG. 8. The subtraction signal 725 output by the multi-target detection block 720 is provided to the subtractor 230 and is subtracted from the Doppler FFT output 215 (during the first iteration) or from the previous subtraction result 235 (in subsequent iterations). The subtraction signal 725 (one of 725a through 725T for the T processing chains) output by the multi-target detection block 720 includes the strongest peak, due to one of the codes, and associated side lobe contributions, due to cross-correlation with the other T-1 codes, for a detected object 150. As noted with reference to FIG. 2, over the iterations, multiple objects 150 that may otherwise be obscured by the side lobes may be detected in the multi-target detection block 720 of each processing chain. As previously noted with reference to multi-target detection block 220, a single multi-target detection block 720 may be shared by all of the T processing chains for a given receiver 120.

Figure 8:
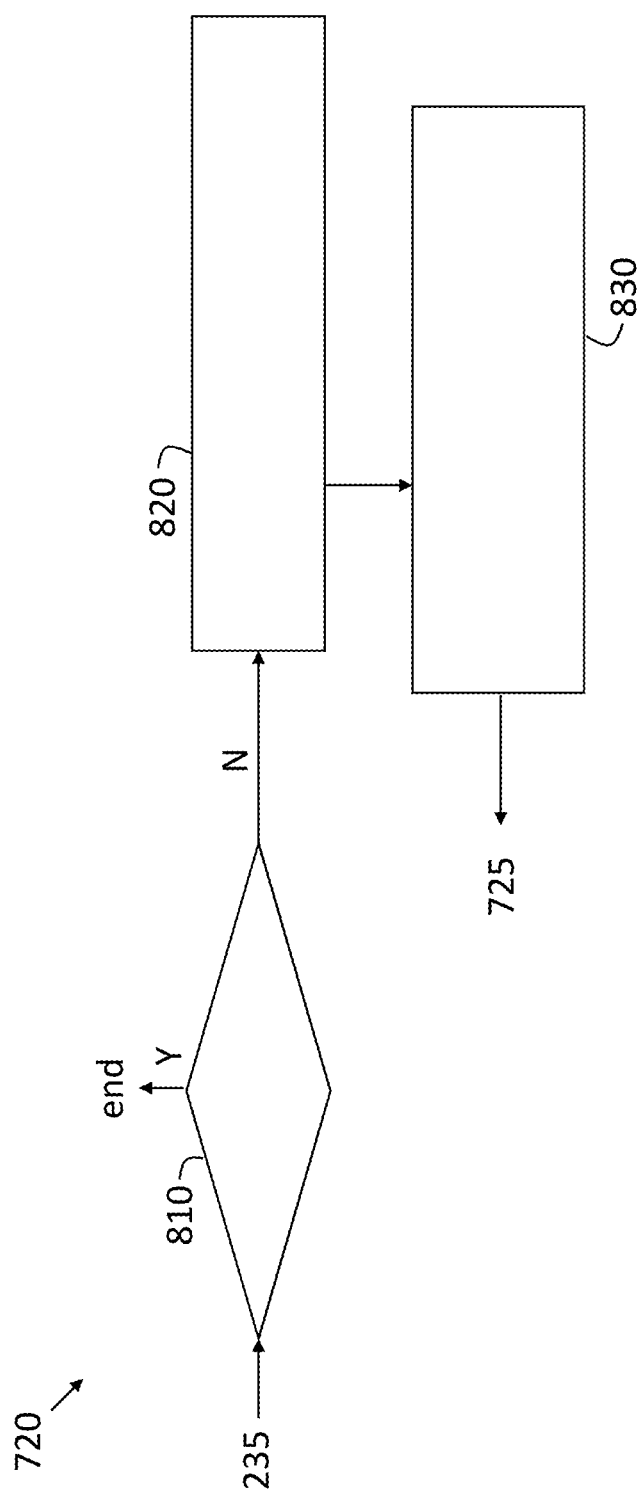
FIG. 8 details processes of the multi-target detection block according to one or more embodiments.

FIG. 8 details processes of the multi-target detection block 720 of FIG. 7 according to one or more embodiments. The subtraction result 235 is provided to the multi-target detection block 720 at each iteration. At block 810, a check is done to see if the maximum peak in the subtraction result 235 is less than or equal to a threshold value. The threshold value may be a predefined object detection threshold value, and may be a dynamic threshold. If the maximum peak is below this threshold value, then it is determined that there is no object 150 for detection and the processing chain ends without further iterations or completion of the multi-target detection block 720. If the maximum peak is not less than or equal to the threshold value, then the process at block 820 is performed. At block 820, estimating amplitude, delay (i.e., range), and Doppler frequency (i.e., relative velocity) for the maximum peak results in detecting the object 150 in the field of view of the radar system 110 that resulted in the strongest reflection (for the given iteration). At block 830, the process results in generating a clean signal (subtraction signal 725) associated with the detected object 150 and its associated cross-correlation so that all contributions from the already detected object 150 can be removed by the subtractor 230 shown in FIG. 7.

Generating T CDMA signals, at block 830, differs from the process of generating T CDMA signals at block 330 (FIG. 3). According to the exemplary embodiment of FIG. 8, generating T CDMA signals with estimated and known parameters is from a pre-calculated table. That is, the CDMA signals are pre-generated and may be selected from a look-up table, for example. As noted with reference to FIG. 3, the estimated parameters include amplitude, delay, and Doppler frequency, estimated at block 820, and the known parameters are the known CDMA signal parameters and function that were used to generate the transmitted signal 115. This subtraction signal 725 then represents the complete contribution to the received signal 125 because of the object 150 that was detected at block 820.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of performing multi-target detection in a code division multiple access (CDMA) radar system, the method comprising:

transmitting, from each transmitter among T transmitters, a transmitted signal with a different code;

receiving, at each receiver among one or more receivers, a received signal that includes reflections resulting from each of the transmitted signals with the different codes;

processing the received signal at each of the one or more receivers by implementing T processing chains, wherein each of the T processing chains is iterative;

detecting an object at each completed iteration at each of the T processing chains; and subtracting a subtraction signal representing a contribution of the object to the received signal prior to subsequent iterations.

2. The method according to claim 1, wherein the processing the received signal by implementing the T processing chains includes applying a matched filter, at each of the T processing chains, with a different one of the different codes.

3. The method according to claim 2, wherein the processing the received signal includes performing a fast Fourier transform (FFT) in a Doppler domain on an output of the matched filter in each of the T processing chains.

4. The method according to claim 3, wherein the processing the received signal at each of the T processing chains includes implementing a detection by detecting the object with a strongest reflection followed by generating a clean received signal resulting from the object and from cross-correlation with the different codes other than the different one of the different codes at each of the T processing chains.

5. The method according to claim 4, wherein the processing the received signal includes providing the clean received signal to a subtractor for subtraction.

6. The method according to claim 5, wherein the processing the received signal includes providing a result of the subtraction to the matched filter.

7. The method according to claim 6, wherein the processing the received signal includes subtracting the clean received signal from the received signal during a first iteration of the iterations and from the result of the subtraction for a previous iteration for every subsequent iteration of the iterations.

8. The method according to claim 5, wherein the processing the received signal includes providing a result of the subtraction to the implementing the detection.

9. The method according to claim 8, wherein the processing the received signal includes subtracting the clean received signal from a result of the FFT in the Doppler domain during a first iteration of the iterations and from the result of the subtraction for a previous iteration for every subsequent iteration of the iterations.

10. The method according to claim 1, further comprising including the radar system in a vehicle and controlling operation of the vehicle based on information about the object detected at each completed iteration of each of the T processing chains.

11. A system to perform multi-target detection in a code division multiple access (CDMA) radar system, the system comprising:
T transmitters configured to transmit, from each transmitter among the T transmitters, a transmitted signal with a different code;
one or more receivers configured to receive, at each receiver among the one or more receivers, a received signal that includes reflections resulting from each of the transmitted signals with the different codes; and
a processor configured to process the received signal at each of the one or more receivers by implementing T processing chains, wherein each of the T processing chains is iterative, to detect an object at each completed iteration at each of the T processing chains, and to subtract a subtraction signal representing a contribution of the object to the received signal prior to subsequent iterations.

12. The system according to claim 11, wherein the processor is configured to apply a matched filter, at each of the T processing chains, with a different one of the different codes.

13. The system according to claim 12, wherein the processor is configured to perform a fast Fourier transform (FFT) in a Doppler domain on an output of the matched filter in each of the T processing chains.

14. The system according to claim 13, wherein the processor is configured to detect the object with a strongest reflection and then to generate a clean received signal resulting from the object and from cross-correlation with the different codes other than the different one of the different codes at each of the T processing chains.

15. The system according to claim 14, wherein the processor is configured to provide the clean received signal to a subtractor for subtraction.

16. The system according to claim 15, wherein the processor is configured to provide a result of the subtraction to the matched filter.

17. The system according to claim 16, wherein the processor is configured to subtract the clean received signal from the received signal during a first iteration of the iterations and from the result of the subtraction for a previous iteration for every subsequent iteration of the iterations.

18. The system according to claim 15, wherein the processor is configured to provide a result of the subtraction to detect the object in a next iteration of the iterations.

19. The system according to claim 18, wherein the processor is configured to subtract the clean received signal from a result of the FFT in the Doppler domain during a first iteration of the iterations and from the result of the subtraction for a previous iteration for every subsequent iteration of the iterations.

20. The system according to claim 11, wherein the radar system is in a vehicle and operation of the vehicle is based on information about the object detected at each completed iteration of each of the T processing chains.

* * * * *